Dec. 3, 1940.  E. L. BLAKESLEE  2,223,595
DEGREASING MEANS
Filed July 31, 1939
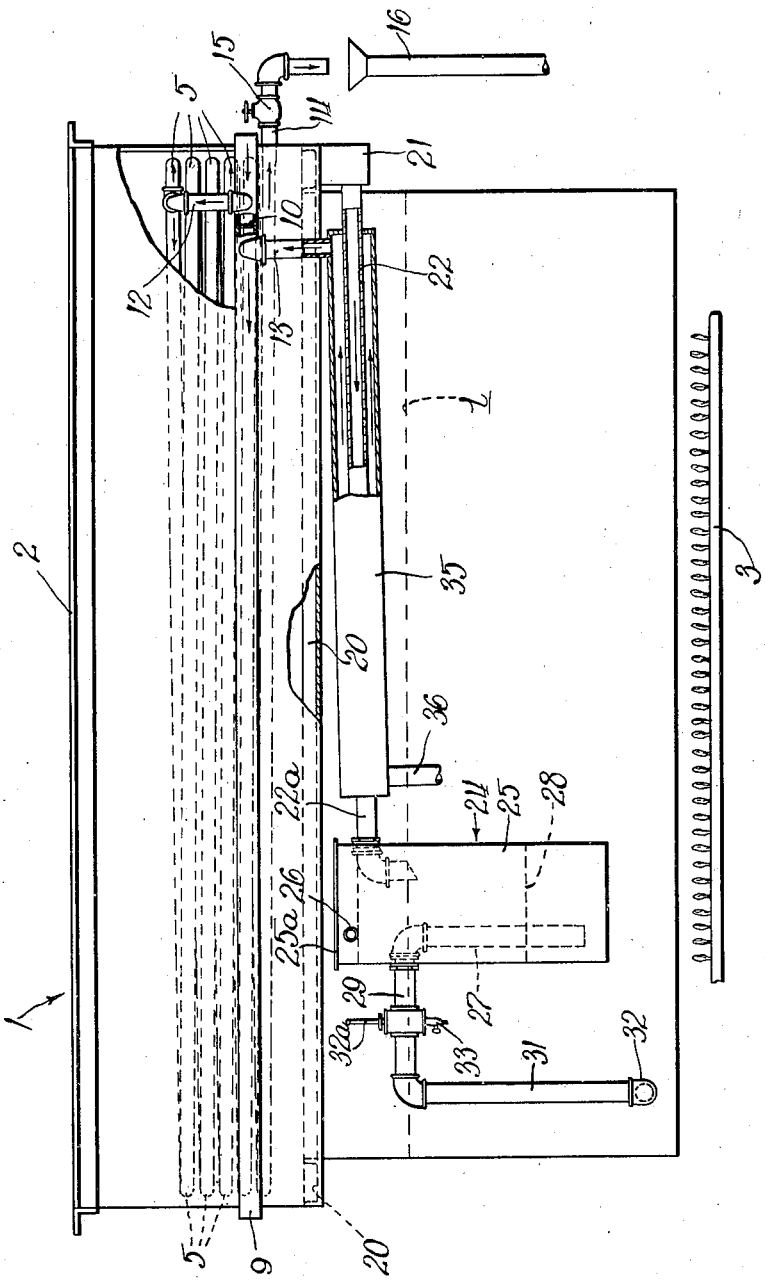
Inventor:
Edward L. Blakeslee
By Brown, Jackson, Boettcher & Dienner
Attys Patented Dec. 3, 1940

2,223,595

UNITED STATES PATENT OFFICE 2,223,595

DEGREASING MEANS

Edward L. Blakeslee, Oak Park, Ill., assignor to G. S. Blakeslee & Co., Cicero, Ill., a corporation of Illinois Application July 31, 1939, Serial No. 287,578

2 Claims. (Cl. 202—170)

This invention relates to degreasing machines and particularly to those which employ a heated volatile solvent for receiving the articles to be cleansed and provided with cooling zones within the machine for condensing the vapors arising from the heated volatile substance and returning the condensate to the body of liquid. Machines of this general type are well known and are customarily employed for cleaning metal parts of all grease, dirt, wax and the like, so as to produce a chemically clean surface for the purpose of preparing the articles for subsequent plating and other operations.

One of the volatile solvents in use at the present time is trichlorethylene, which has a boiling point of around 200° F. and the vapor of which is several times heavier than air. In order to prevent the escape of such vapors from the tank or other container in which the degreasing operations are carried out, it is customary to provide the tank or container with cooling coils or other means, generally in the upper portion of the tank, for chilling and condensing the vapors so as to prevent them from passing the chilled zone and escaping from the tank, the condensed vapors being returned to the liquid in the tank. Generally, ordinary tap water has a temperature sufficiently low to provide the desired cooling effect, and frequently the temperature of the cooling coils through which the tap water is directed is sufficiently low that water vapors from the atmosphere, as well as the solvent vapors from the tank, are condensed by the cooling coils, become mixed with the solvent condensate, and are returned to the tank along with the solvent condensate. It has been found, however, that the addition of water to the solvent in any appreciable quantities materially reduces the boiling point of the water-solvent mixture and in other ways interferes with the desired action of the solvent.

In an attempt to avoid the disadvantages of adding condensed water vapors to the solvent in the tank, it has heretofore been proposed to run the condensed solvent and any condensed atmospheric water vapors into a water separator before returning the liquid solvent to the tank. While such machines have proved to be quite satisfactory, it has been found that in machines where the liquid solvent is operated at elevated temperatures, the condensation of water vapor from the atmosphere along with the condensation of the solvent vapors by the cooling coils, produced a mixture having sufficient water to reduce the boiling point, with the result that not infrequently considerable ebullition occurred within the water separator and the resulting agitation materially interfered with the desired separation of water and solvent.

Having the above in mind, the object and general nature of this invention is the provision of means for flowing the cooling water in thermal contact with the liquid condensate collected from below the cooling coils. The advantages of this operation are threefold. First, by the time the water-solvent distillate collected from underneath the cooling coils reaches the separator it is reduced in temperature to a point below the boiling point of the mixture, thereby reducing or eliminating ebullition in the water separator and facilitating the separation of the water and solvent at this point. Second, the thermal contact between the cooling water flowing toward the cooling coils and the water-solvent distillate flowing away from the coils towards the separator, serves to warm the cooling water, raising its temperature above the dew point and reducing, if not entirely eliminating, the tendency for the cooling coils to condense water vapor from the atmosphere. However, the temperature of the cooling coils is such that all solvent vapors are condensed and none is allowed to pass above the vapor level maintained by the cooling coils. Third, any tendency to form chlorine acids, or to the presence of moisture in the solvent, is eliminated. The condensation of atmospheric water vapor on the cooling coils is undesirable, particularly where the solvent used is a chlorinated hydrocarbon, because of the formation of chlorine acid gases which have a great affinity for moisture and act with the condensed water vapor to form chlorine acids. Such acids not only attack and corrode the coils themselves but, if allowed to get into the solvent, also accelerate decomposition of the latter.

These and other objects and advantages of the present invention will be apparent to those skilled in the art after a consideration of the following detailed description of the preferred structural embodiment, taken in conjunction with the accompanying drawing, in which the single figure shows one form of degreasing machine in which the present invention has been incorporated, it being understood that various other kinds of cleaning machines may be used.

Referring now to the drawing, the degreasing machine shown embodies a tank 1 which is open at the top 2 and which may have any suitable form of heating means, represented by gas burners 3, for heating the contents of the tank 1. A suitable solvent, such as trichlorethylene or other chlorinated hydrocarbon, is carried within the tank 1, the liquid level of the solvent being indicated at $l$, which may, of course, vary as desired. Disposed appreciably above the liquid level of and in the upper portion of the tank 1 are interconnected cooling coils 5, supported on the inside of the tank adjacent the walls thereof in any suitable manner. Disposed about the tank, preferably, but not necessarily, on the outside thereof, is a cooling manifold or girdle 9, ordinarily termed a "cold spot", which encircles the tank and forms a passage for cooling water which serves to prevent the transmission of heat by conduction along the walls of the tank from the heated lower portion thereof to the portions of the tank adjacent the cooling coils 5. A dam 10 is disposed within the cooling manifold or "cold spot" 9 and a pipe connection 12 extends from the manifold 9 adjacent the dam 10 to the upper coil 5. An inlet pipe 13 is connected to the cold spot 9 at the side of the dam 10 opposite the pipe connection 12, so that water flowing into the manifold from the connection 13 is forced to flow entirely around the same before flowing up the pipe connection 12 and into the upper coil 5 on the inside of the tank. The lowermost coil 5 is provided with an outlet 14 to which is connected a valve 15. The water discharged from the lower cooling coil through outlet 14 enters a drain pipe 16 and flows to waste, or some other point of utilization, as desired.

A trough 20, formed in any suitable manner, is disposed inside the tank 1 substantially directly underneath the cooling coils 5. The trough 20 is arranged to receive condensate that drips from the cooling coils 5. As mentioned above, this condensate consists of condensed vapors of the solvent, together with any water vapors which may have been condensed from atmosphere. The condensate flows into a discharge box 21 from which the condensate enters a pipe 22 that slopes downwardly and is conducted to a water separator, indicated in its entirety by the reference numeral 24. The water separator consists of a container 25 having a tight cover 25a, a condensate inlet 22a, which forms an extension of the pipe 22, a water outlet 26 adjacent the upper end of the container 25, and a solvent outlet 27. The condensate collects in the container 25, where its velocity is reduced by the increased volume. Since trichlorethylene is about 1½ times as heavy as water it will, under these conditions, separate from the water, the solvent collecting at the bottom of the container and the water floating on top of the solvent, the separating line between the two liquids being indicated at 28.

The opening into the solvent outlet 27 is slightly above the bottom of the container 25 and hence is at the lowermost part of the separated solvent, below the line 28. Since the solvent exit 27 is at a lower level than the condensate inlet 22a, all condensate entering the separator 24 will separate from the water, the water floating on top and the solvent sinking and displacing, volume for volume, water at the bottom, the displaced solvent flowing out through the solvent outlet 27. As the separated water continues to collect above the solvent, its level rises until it reaches the water outlet 26, where it overflows out of the separator. A connection consisting of a horizontal pipe 29 and a downwardly extending pipe 31, conducts the solvent separated in the container 25 back to the tank 1, as indicated at 32. The horizontal solvent outflow pipe 29 contains a vent 32a in its topmost part so as to prevent the siphoning out of the contents of the separator 24. The pipe 29 may also include a sampling valve 33, if desired.

Disposed about the condensate pipe 22 is a manifold 35, the ends of which are closed, the upper end being connected to the pipe 13 while the lower end receives a pipe 36 which constitutes the inlet for the cooling water. Usually the cooling water is taken from any convenient tap, and as the cooling water flows through the manifold 35 about the outside of pipe 22 up to the cold spot 9 through connection 13, there is a heat exchange between the cooling water and the condensate, the latter becoming cooler and the former becoming warmer. The cooling water, thus warmed, flows about the cold spot 9 around the upper portion of the tank 1, and then up through the connection 12 to the cooling coils 5, finally being discharged into the drain pipe 16. The condensate collected by the trough 20 and which flows down through the pipe 22 to the water separation chamber 24 is cooled, so that by the time it enters the water separation tank 24 its temperature is reduced, so that there is no agitation in the tank 24 and the desired separation takes place promptly. Where the solvent is trichlorethylene, the parts are so designed that the temperature of the condensate as it reaches the separation tank is approximately at or below 163 to 165° F. Thus, ebullition of the mixture is prevented, and the water and solvent separate rapidly.

There is a further advantage of warming the tap water by causing the same, first, to absorb heat from the outwardly flowing condensate and, second, by passing entirely around the "cold spot" 9 before entering the cooling coils, in that the temperature of the latter is low enough to condense the solvent vapors but not low enough to be below the dew point of the atmosphere under normal operating conditions. Thus, according to the present invention, the condensate contains even less amounts of water than heretofore, and, of course, the separation of any water that is in the condensate is facilitated by reducing the temperature of the condensate before it enters the water separator, as pointed out above. Still further, since there is little or no water vapor condensed on the coils 5, there are practically no chlorine acids formed which might attack and corrode the coils and tanks, or get into the solvent and accelerate its decomposition.

While I have shown and described the preferred form of my invention, it will be understood that this invention is not to be limited to the particular details shown and described, but that, in fact, widely different means may be employed in the practice of the broader aspects of my invention.

What I claim, therefore, and desire to secure by Letters Patent is:

1. In an apparatus for degreasing articles, a container adapted to contain a bath of trichlorethylene, means for heating said bath of trichlorethylene substantially to the boiling point, cooling coils carried at the upper portion of the tank adjacent the walls thereof, conduit means for directing a flow of cooling fluid through said cooling coils so as to reduce the temperature of the space within said coils to the point where trichlorethylene vapors will condense, means for collecting the condensate that drips from said coils, a separator receiving said condensate from said means for separating any water in the condensate from the trichlorethylene, means for delivering the separated trichlorethylene back to said container, and means bringing the flow of condensate into thermal contact with the flow of cooling fluid passing to said coils, whereby the temperature of the condensate is reduced to a point below the boiling point of a mixture of trichlorethylene and water and the temperature of the cooling fluid is raised so that said cooling coils are above the dew point of the atmosphere surrounding said coils, whereby to reduce the amount of condensed water vapors entering said condensate collecting means with the condensed trichlorethylene vapors.

2. In a degreasing machine, a tank adapted to contain a volatile liquid solvent at a predetermined normal level therein, means for heating said liquid solvent, cooling coils in said tank above said normal level, a water and solvent gravity separator comprising a container, means exterior of said tank defining two separate passages in thermal conducting relation to each other, one of said passages discharging into said container, means for circulating cooling liquid through the other of said passages and through said cooling coils, means for delivering to said first mentioned passage condensate from said coils, and means for delivering to said tank liquid solvent from said container.

EDWARD L. BLAKESLEE.